W. C. MEYER.
CHANNELING MACHINE.
APPLICATION FILED NOV. 7, 1906. RENEWED NOV. 28, 1910.

984,773.

Patented Feb. 21, 1911.

5 SHEETS—SHEET 4.

Witnesses:
E. C. Wurdeman
A. C. Richardson.

Inventor:
William C. Meyer
by his Attorneys
Phillips Van Everen & Fish

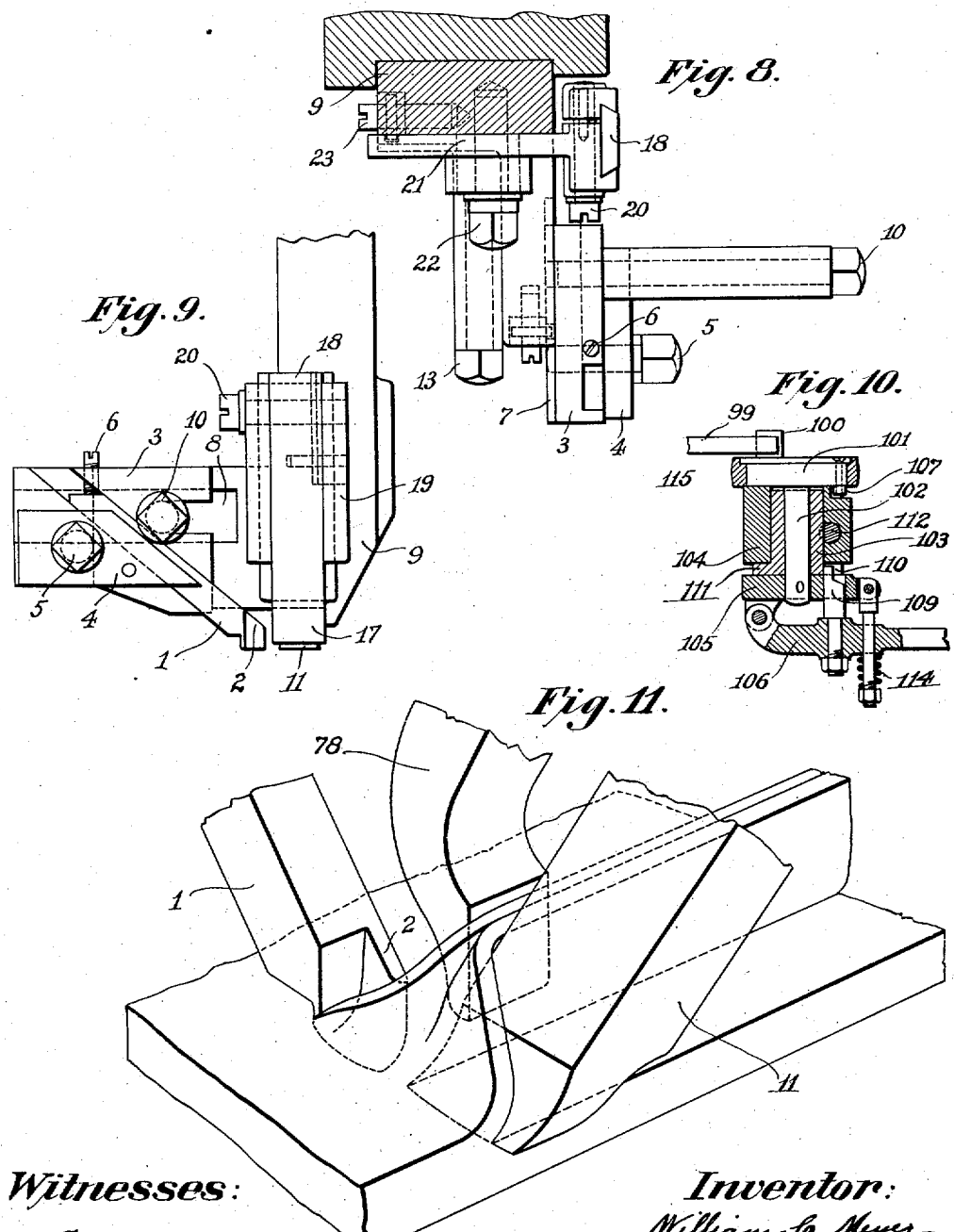

UNITED STATES PATENT OFFICE.

WILLIAM C. MEYER, OF BOSTON, MASSACHUSETTS, ASSIGNOR TO UNITED SHOE MACHINERY COMPANY, OF PATERSON, NEW JERSEY, A CORPORATION OF NEW JERSEY.

CHANNELING-MACHINE.

984,773.     Specification of Letters Patent.     Patented Feb. 21, 1911.

Application filed November 7, 1906, Serial No. 342,328. Renewed November 28, 1910. Serial No. 594,602.

*To all whom it may concern:*

Be it known that I, WILLIAM C. MEYER, a citizen of the United States, residing at Boston, in the county of Suffolk and State of Massachusetts, have invented certain new and useful Improvements in Channeling-Machines; and I do hereby declare the following to be a full, clear, and exact description of the invention, such as will enable others skilled in the art to which it appertains to make and use the same.

The present invention relates to improvements in channeling machines.

In the manufacture of insoles for use on welted boots and shoes and of soles for turned shoes it is customary to prepare the margins of the insoles and soles for the reception of the stitches by channeling, shouldering, slitting, and otherwise, and the object of the present invention is to produce an improved machine for so channeling and otherwise preparing insoles and turned soles.

In its illustrated embodiment the invention is particularly adapted for preparing insoles of the type in which two flaps are cut from the surface of the material by a channeling knife and an edge-slitting knife respectively and are then turned up and secured together to form a single compound lip.

The invention consists in a channeling machine embodying the improved features of construction and operation hereinafter set forth, as defined in the claims.

Figure 1:
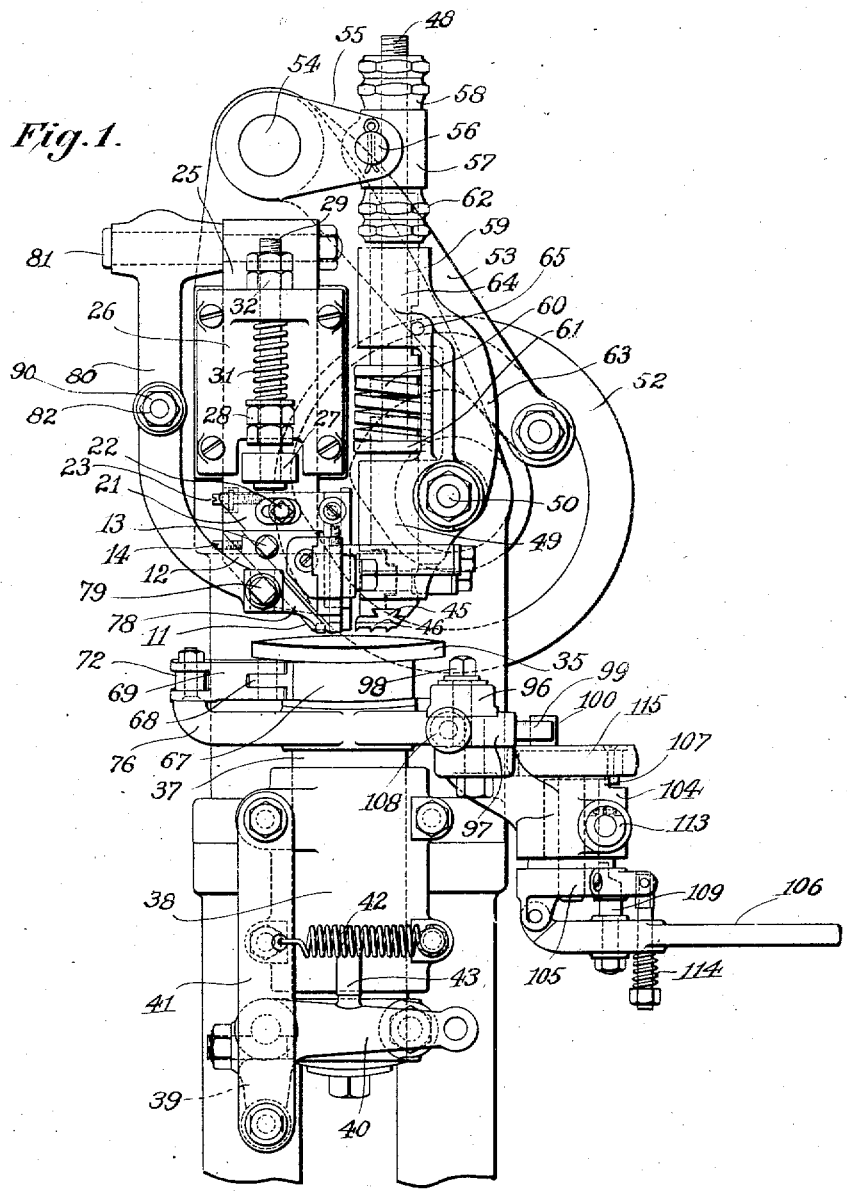
Figure 2:
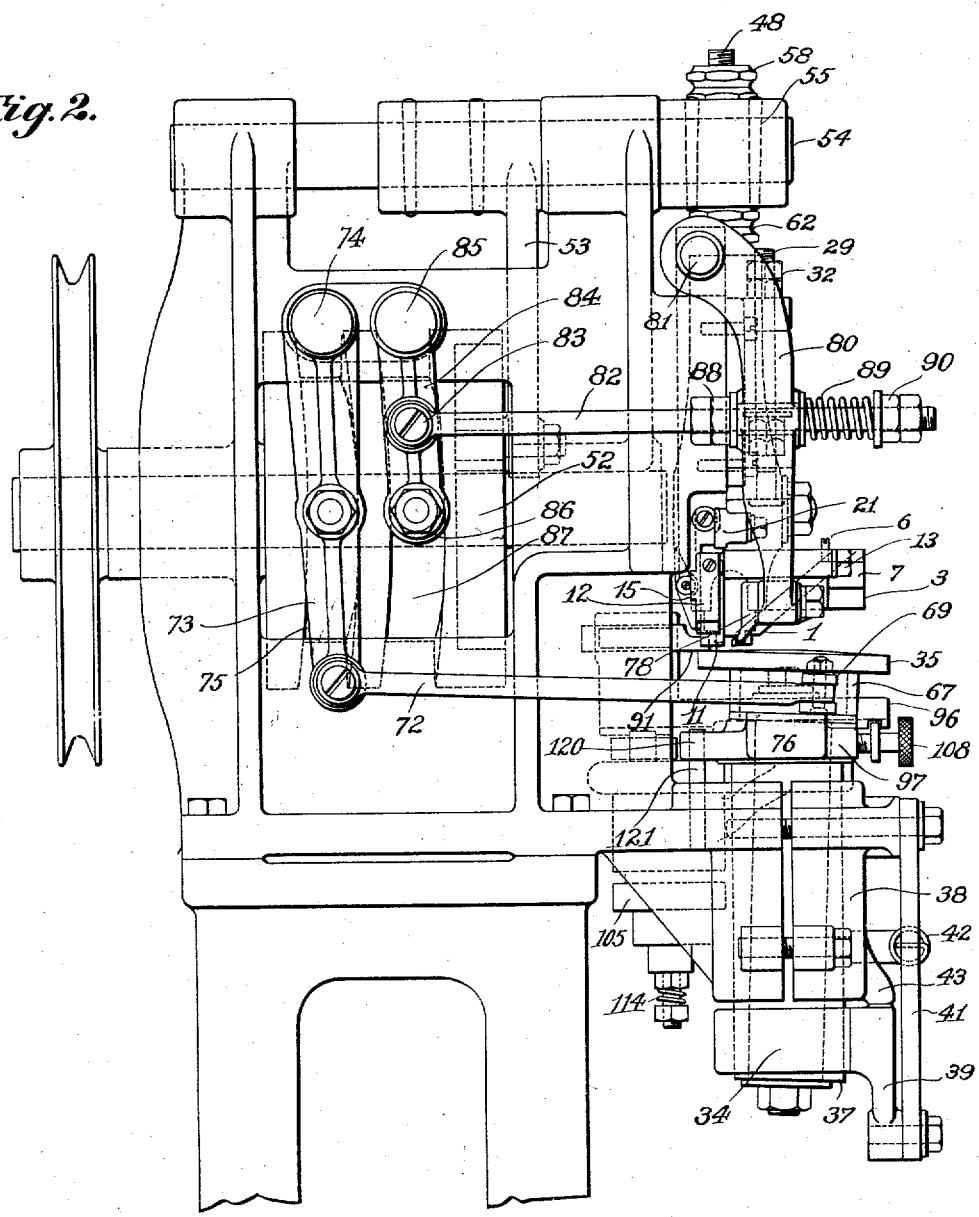
Figure 3:
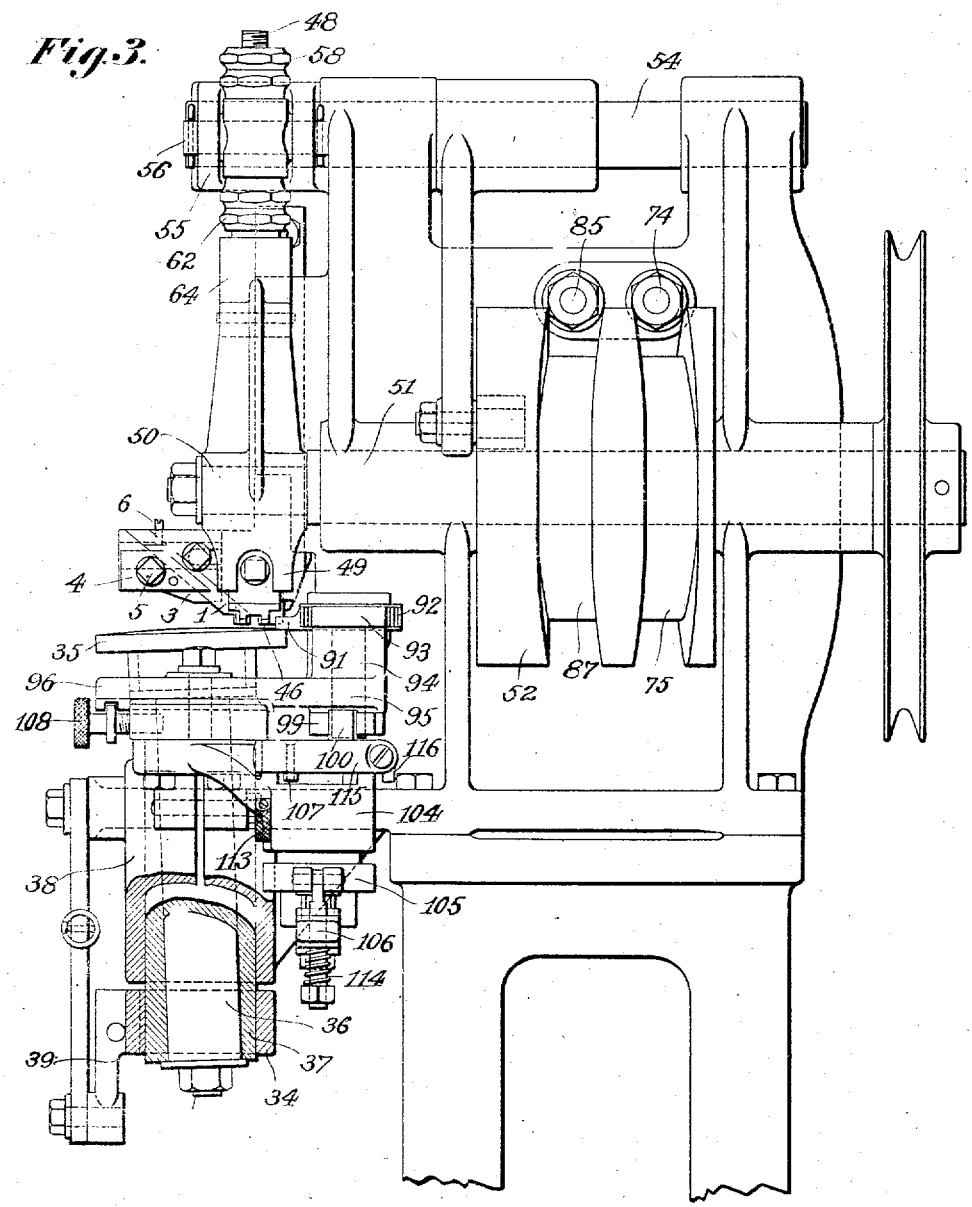
Figure 4:
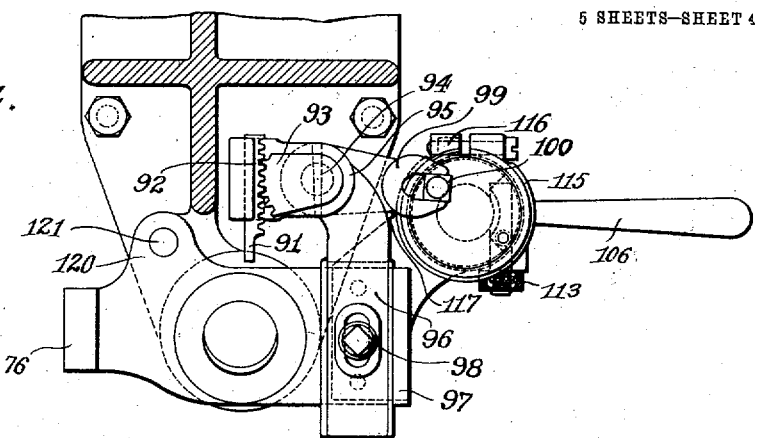
Figure 5:
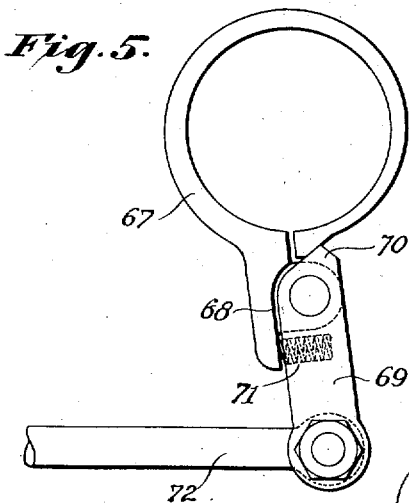
Figure 6:
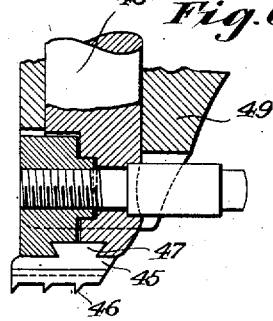
Figure 7:
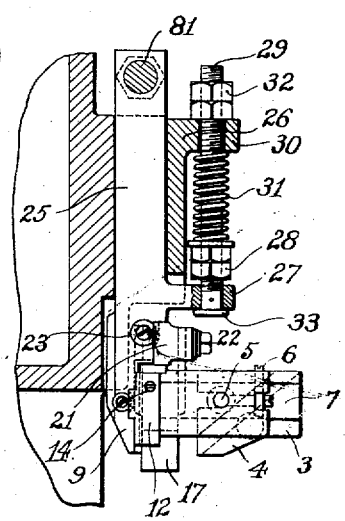

In the drawings Figure 1 is a front elevation of a channeling machine embodying the present invention; Fig. 2 is a left-hand side elevation; Fig. 3 is a right-hand side elevation; Fig. 4 is a plan view of the edge gage and its actuating mechanism; Fig. 5 is a detail plan view of a part of the mechanism for rotating the work support; Fig. 6 is a detail vertical section of the lower extremity of the feeding mechanism; Fig. 7 is a detail vertical section showing the mounting of the knife carrier; Fig. 8 is a plan view of the knife carrier and associated parts; Fig. 9 is a right-hand side elevation of the same parts; Fig. 10 is a vertical sectional detail of a part of the edge-gage actuating mechanism, and Fig. 11 is an enlarged perspective view showing the operation of the knives and the hammer upon the work.

The illustrated embodiment of the invention comprises a channeling knife and an edge-slitting knife for cutting and turning up the flaps which form the lip on an insole, a hammer for setting the flaps in their upturned position and securing them together, a work support engaging the work opposite to the knives, a four-motion feeding device engaging the work on the same side as the knives, and a movable edge gage for determining the distance of the lip from the edge of the insole.

The channeling knife 1 consists of a square bar formed at its lower end, as shown in Figs. 9 and 11, with a horizontal cutting edge, and a vertical plow 2 which serves to turn up the flap cut by the knife. The channeling knife is mounted in inclined position in a groove in a knife block 3, being held therein by a clamp plate 4 fixed by a screw 5. An adjusting screw 6 engaging the upper end of the knife provides for longitudinal adjustment thereof. The knife block 3 is provided with a horizontal tongue 7 (Figs. 8 and 9) engaging a horizontal groove 8 in the knife carrier 9, and is fixed in place by a screw 10 engaging a slot in the knife block. This arrangement permits horizontal adjustment of the channeling knife. The edge-slitting knife 11 (see Figs. 1 and 2) has a rectangular shank mounted in inclined position in a groove in a knife block 12, being fixed therein by a screw 13. An adjusting screw 14 engaging the upper end of the edge slitting knife provides for longitudinal adjustment thereof. The knife block 12 is provided with a tongue 15 engaging a horizontal groove in the knife carrier 9, and is fixed in place on the carrier by the screw 13. A presser foot 17 to limit the depth to which the knives enter the work is mounted upon the knife carrier. The presser foot has a shank 18 with beveled edges (see Figs. 8 and 9) by which it is clamped in a presser-foot block 19 provided with a clamp screw 20. The presser-foot block has a horizontal shank 21 secured to the knife carrier by a screw 22 engaging a horizontal slot in the shank 21. An adjusting screw 23 engaging the shank provides for horizontal adjustment thereof to vary the distance between the presser foot and the knives. The connection of the presser foot with its block permits vertical adjustment of the presser foot to vary the depth of the cuts produced by the knives.

The knife carrier 9 is mounted to yield vertically to permit the knives and the presser foot to yield according to the thickness of the work, this being necessary since the work support, as will be presently described, has no provision for vertically yielding. The knife carrier has a vertical shank 25 (Fig. 7) which slides in a guideway on the front of the frame of the machine, being confined therein by a cover plate 26. A lug 27 extends forward from the shank 25 and engages, when the knife carrier is in raised position owing to the insertion of an insole blank, adjusting nuts 28 threaded on a rod 29 mounted in a lug 30 on the cover plate 26. A compression spring 31 surrounding the rod 29 and engaging the nuts 28 resists the upward movement of the lug 27 and the knife carrier, and operates to hold the presser foot normally in engagement with the blank and the knives in operative position. Adjusting nuts 32 on the rod 29 serve to limit the movement of the rod 29 under the influence of the spring 31. The downward movement of the knife carrier is limited by a head 33 on the lower end of the rod 29.

The work support 35 consists of a slightly convex circular table mounted upon a stem 36 (Fig. 3) which is rotatably mounted in a slightly inclined position in a vertical slide 37. The slide 37 moves in a bracket 38 on the front of the frame of the machine and is provided at its lower end with a clamp collar 34 on which is journaled a bell crank lever having a depending arm 39 and a normally horizontal arm 40. The depending arm 39 is pivotally mounted with a vertical link 41 pivoted at its upper end to the bracket 38. A spring 42 connected at one end to the link 41 and at the other end to the bracket 38 tends to swing the link 41 to the position of Fig. 1 so as to maintain the link and the arm 39 in line and the horizontal arm 40 in raised position, the upward movement of the arm 40 being limited by a stop 43 on the bracket 38. When the parts are in this position the slide 37 and the work support are maintained unyieldingly in raised position owing to the arm 39 and the link 41 being in line, but when the horizontal arm 40 is drawn down either manually or by connection with a suitable treadle, the link 41 is swung to the left and the pivotal support of the bell crank lever is lowered drawing down the slide 37 and the work support to permit the insertion of work. When the arm 40 is released the spring 42 raises the work support.

The novel work support actuating means is not claimed herein as it is claimed in an application formed by a division from this application and filed Sept. 22, 1909, Serial No. 519,022.

The four-motion feeding mechanism comprises a feeding device 45 (Figs. 1 and 6) provided with two rows of teeth 46 which engage the upper surface of the insole blank. The feeding device is removably secured, as shown in Fig. 6, by means of a dove-tail projection 47, to the lower end of a rod 48 by which vertical and horizontal movements are imparted to it. The lower portion of the rod 48 has a bearing in a sleeve 49 in which it is free to move longitudinally, and the sleeve is engaged by a crank pin 50 eccentrically mounted in the forward end of the drive shaft 51 of the machine. The sleeve 49 thus operates, as the drive shaft rotates, to impart lateral movements to the rod 48, and to move the feeding device horizontally the vertical movements of the sleeve 49 not being transmitted to the rod and the feeding device. Vertical movements are imparted to the rod 48 by mechanism comprising a cam 52 mounted on the drive shaft 51, a cam lever 53 actuated thereby and fixed to a rock shaft 54 journaled in the frame of the machine, and an arm 55 fixed to the forward end of the rock shaft 54 and connected with the rod 48. The arm 55 is pivotally connected at 56 with a sleeve 57 through which the rod 48 passes, and when the arm 55 rises under the influence of the cam lever 53 and cam 52 the sleeve 57 engages adjusting nuts 58 on the rod 48 and raises the rod and the feeding device. The downward movements of the rod and feeding device are imparted through an interposed spring which permits the movement of the feeding device to be arrested by its engagement with the upper surface of the work, whatever the thickness thereof may be. For this purpose the upper portion of the rod 48 is surrounded by a sleeve 59 free to move longitudinally with respect to the rod and engaging at its lower end a compression spring 60. The lower end of the compression spring engages a collar 61 fixed on the rod 48. The upper end of the sleeve 59 carries adjusting nuts 62 which engage the lower end of the sleeve 57 and limit the relative movement of the sleeve 59 and the rod 48 under the influence of the spring 60. By turning the adjusting nuts 62 the sleeve 59 may be raised or lowered to diminish or increase the compression of the spring 60. When the arm 55 falls, under the influence of the cam lever 53, the rod 48 and feeding device fall until the latter is pressed firmly against the insole blank, and thereafter during the continued downward movement of the arm 55 the rod 48 remains vertically stationary while the sleeve 57 continues to descend, operating, through the adjusting nuts 62 and the sleeve 59, to compress the spring 60. The cam 52 is so timed with respect to the crank pin 50 that the feeding device is first lowered to engage the work, then moved horizontally to feed the work, then raised and returned horizontally to its initial position. A yoke 63 connects the sleeve 49 with a sleeve 64 which embraces the sleeve 59 and acts as an additional guide to prevent cramping of the sleeve 49 on the rod 48. A pin 65 fixed in the sleeve 64 engages a flattened portion of the sleeve 59, as shown in dotted lines, Fig. 1, and prevents rotation of the sleeve 59.

In order to assist the four-motion feeding device in feeding the work, the work support 35 is made to rotate intermittently, in unison with the feeding movement of the feeding device. For this purpose the upper portion of the work-support stem 36 is embraced by a clutch ring 67 (shown particularly in Fig. 5). The clutch ring 67 is a resilient split ring provided with a lug 68 on which is pivotally mounted a lever 69. The lever 69 has a lug 70 engaging the free end of the clutch ring, and a spring 71 located in a recess in the lever 69 tends to maintain the lug 70 in engagement with the ring. The lug 70 operates to pinch the ring against the stem of the work support, the pressure of the ring against the stem depending upon the pressure of the lug against the ring. The end of the lever 69 is pivotally connected with a link 72 which is connected at its rear end with a cam lever 73 pivoted at 74 upon the frame of the machine. The cam lever 73 carries a cam roll engaging a cam path 75 in the cam 52, and the cam path is so formed as to swing the lever 73 forward at the time when the four-motion feeding device is feeding the work. This movement of the cam lever causes the link 72 to swing the clutch lever 69 forward and rotate the work support by means of the clutch ring 67. The resistance to such rotation encountered by the work support causes the lever 69 to pinch the clutch ring against the stem in proportion to such resistance, so that the clutch ring acts positively to rotate the work support during the forward movements of the lever 69, while the resistance of the work to reverse rotation of the work support causes the clutch ring to slide upon the stem during the backward movement of the lever 69. An arm 76 mounted on the upper end of the work support slide 37 provides at its end a bearing surface, as shown in Fig. 1, to support the end of the clutch lever 69.

The use, in conjunction with a four-motion feeding device engaging one side of the work, of means for rotating the work support which engages the other side of the work, renders the feeding of the work positive, and makes practical the use of knives operating with a drag cut as in the present machine, in place of vibrating knives, thereby simplifying the mechanism of the operating parts.

The hammer 78 engages the upturned flaps at a point opposite the shank of the edge slitting knife 11. The hammer is removably secured, by a screw 79 (Fig. 1), to the lower end of the hammer lever 80, which is pivoted at its upper end on a stud 81 fixed in the upper end of the shank 25 of the knife carrier. Owing to this arrangement the hammer occupies always the same vertical position with respect to the knives notwithstanding their rising and falling movements in response to variations in the thickness of the work, and thus the hammer always engages and operates upon the channel flap at the proper position. The hammer is vibrated toward and from the edge slitting knife by means of a rod 82 pivotally connected at 83 with a cam lever 84. The cam lever is pivoted at 85 on the frame of the machine and carries at its lower end a cam roll 86 engaging a cam path 87 in the cam 52. The rod 82 passes loosely through a hole in the lever 80 and is provided with adjusting nuts 88 which engage the lever 80 and move it forward to retract the hammer. The operative movement is imparted to the hammer through a spring 89 engaging the lever 80 at one end and at the other end engaging adjusting nuts 90 on the rod 82. This spring permits the movement of the hammer to be arrested by its engagement with the work, so that the hammer has a yielding action against the work. At each rotation of the drive shaft 51 the hammer strikes a plurality of blows against the channel flap, thereby setting it in its upturned position and securing it to the flap cut by the edge slitting knife, the surface of the work being previously provided with cement for this purpose.

The distance of the lip from the edge of the insole is determined by the edge gage 91. As shown in Fig. 4, the edge gage is provided with a toothed shank 92 engaged by a segmental gear 93 fixed to the upper end of a rock shaft 94 which is journaled in a bracket 95 mounted on the upper end of the work-support slide 37. The bracket 95 is provided with a horizontal shank 96 engaging a slot on a horizontal projection 97 from the slide 37, and the shank 96 is adjustably fixed in position by means of a screw 98 engaging a slot therein and threaded into the horizontal projection 97. The rock shaft 94 carries at its lower end an arm 99 having a forked end engaging a block 100 pivotally mounted on a disk 101 fixed to the upper end of a rock shaft 102 (see Fig. 10). The rock shaft 102 is journaled in a sleeve 103 adjustably fixed in a bracket 104 mounted on the projection 97 from the work support slide 37. The lower end of the rock shaft 102 carries a head 105 to which is pivotally connected a hand lever 106 by which the rock shaft 102 may be turned. When the rock shaft is so turned the block 100 swings the arm 99 thereby actuating the rock shaft 94, the segmental gear 93, and the edge gage 91. In channeling insoles it is customary to use three widths of margin, at the shank portion, the inside of the forepart, and the outside of the forepart respectively, and therefore three adjustable stops are provided for the edge gage to determine its several operative positions. A pin 107 projecting downwardly from the disk 101 engages a recess in the bracket 104, as shown in Figs. 4 and 10, and limits the extreme forward position of the edge gage, which it occupies when channeling with the narrowest margin. The adjustable connection between the shank 96 and the part 97 permits adjustment of such extreme forward position as determined by the pin 107, and for this purpose an adjusting screw 108 is provided, this screw being threaded into the part 97 and provided with a flange engaging the shank 96 as shown in Fig. 3 to move the shank forward or back when the set screw 98 is loosened for the purpose. The intermediate position of the edge gage is determined by a latch 109 carried by the hand lever 106 and engaging a recess 110 in a flange 111 on the lower end of the sleeve 103. The position of this recess is adjusted by turning the sleeve 103, and the sleeve is fixed in adjusted position by a clamp pin 112 provided at its forward end with a lock nut 113. The latch 109 is held in engagement with the recess 110 by a spring 114 which tends normally to swing the hand lever 106 upwardly. By depressing the hand lever the operator releases the latch. The extreme rear position of the edge gage is determined by a clamp collar 115 which is clamped upon the disk 101 and carries a depending lug 116 (shown in dotted lines Fig. 4) which engages a corresponding stop 117 on the bracket 104. This rearward position may be adjusted by loosening the clamp collar 115 and rotating it on the disk 101. When the work support is lowered to insert a fresh blank the edge gage moves downward with it so that when the blank is inserted it acts as a stop to determine the position thereof. The mounting of the edge-gage-actuating mechanism upon the work-support slide avoids the necessity of yielding connections between the edge gage and its actuating mechanism.

To prevent rotation of the work support slide in the bracket 38 the slide is provided with a lug 120 (Figs. 2 and 4) which is engaged by a vertical pin 121 fixed in the frame of the machine and passing loosely through a hole in the lug 120.

To operate the machine the drive shaft is set in motion and the work support is depressed by the operator and a blank inserted between the work support and the presser foot. The work support is then allowed to rise and the operator guides the blank as it is fed through the machine, and at the junctures between the shank and the inside and the outside of the forepart the operator moves the hand lever 106 to vary the width of the margin as is required.

Although the invention has been illustrated as embodied in a machine for preparing insoles of a particular character, it is not in its broadest aspects limited to such a machine, but may be used in machines for performing other analogous operations.

The invention is not, in general, limited to the details of construction and operation of the illustrated embodiment, but may be embodied in other forms broadly defined in the claims.

Having now described the invention, what is claimed is:—

1. A channeling machine having, in combination, a channeling knife, a reciprocating sole feeding device engaging and intermittently operating on one side of the sole at a point adjacent the channeling knife, a rotating sole support engaging the other side of the work, and means for rotating the work support intermittently in unison with the feeding movements of the sole feeding device, substantially as described.

2. A channeling machine having, in combination, a channeling knife, a four-motion sole feeding device engaging the channeled side of the sole at a point adjacent the channeling knife, a rotating work support engaging the other side of the sole, and means for rotating the work support intermittently in unison with the feeding movements of the sole feeding device, substantially as described.

3. A channeling machine having, in combination, a rotating vertically-movable work support for supporting a flat sole, means for raising the work support and for holding it unyieldingly in raised position, a channeling knife, a yielding carrier therefor and means for rotating the work support to feed the sole, substantially as described.

4. A channeling machine having in combination, a vertically-movable rotatable work support for supporting a flat sole, means for raising the work support and for holding it unyieldingly in raised position, a channeling knife, a yielding carrier therefor, and a feeding device yieldingly engaging the sole on the work support, substantially as described.

5. A channeling machine having, in combination, means for supporting and feeding the work, a channeling knife, a yielding carrier therefor, a lip hammer, a carrier for the hammer mounted on the knife carrier so as to move in unison with the yielding movements thereof, and means for actuating the hammer carrier, substantially as described.

6. A channeling machine having, in combination, means for supporting and feeding the work, a channeling knife, a spring-pressed yielding knife carrier, a vibrating hammer carrier, pivoted at one end to the knife carrier and carrying a hammer at its other end, and means for vibrating the hammer carrier, substantially as described.

7. A channeling machine having, in combination, a channeling knife, a vertically movable work support, means for lowering and raising the work support to release and enter the work, an edge gage and manually-operable actuating means for advancing and retracting it during the operation of the machine, said gage and its actuating means being connected and arranged to rise and fall with the work support, substantially as described.

8. A channeling machine having, in combination, a work support, an edge gage provided with a toothed shank, a gear engaging the shank and connected with a lever, and means for moving the lever comprising a pin engaging the end of the lever and eccentrically fixed on a manually rotatable shaft, substantially as described.

9. A channeling machine having, in combination, a channeling knife, a work support, and a four-motion feed mechanism comprising a rod carrying a feeding device at one end, a sleeve embracing the rod, a drive shaft, crank connections between the shaft and the sleeve for reciprocating the latter, a cam carried by the shaft, and a cam lever actuated thereby and connected with the rod to impart longitudinal movements thereto, substantially as described.

10. A channeling machine, having, in combination, a rotatable work support for supporting a flat sole, a work feeding device above the work support, actuating means for said feeding device to cause it to engage and feed the sole, and means for rotating the work support intermittently in unison with the feeding movements of the work feeding device, substantially as described.

In testimony whereof I affix my signature, in presence of two witnesses.

WILLIAM C. MEYER.

Witnesses:
FRED O. FISH,
ALFRED H. HILDRETH.

---

Corrections in Letters Patent No. 984,773.

It is hereby certified that in Letters Patent No. 984,773, granted February 21, 1911, upon the application of William C. Meyer, of Boston, Massachusetts, for an improvement in "Channeling-Machines," errors appear in the printed specification requiring correction as follows: Page 4, line 89, the word "sole" should read *work*, and same page, line 90, first occurrence, the word "work" should read *sole;* and that the said Letters Patent should be read with these corrections therein that the same may conform to the record of the case in the Patent Office.

Signed and sealed this 21st day of March, A. D., 1911.

[SEAL.]

E. B. MOORE,
*Commissioner of Patents.* pressed yielding knife carrier, a vibrating hammer carrier, pivoted at one end to the knife carrier and carrying a hammer at its other end, and means for vibrating the hammer carrier, substantially as described.

7. A channeling machine having, in combination, a channeling knife, a vertically movable work support, means for lowering and raising the work support to release and enter the work, an edge gage and manually-operable actuating means for advancing and retracting it during the operation of the machine, said gage and its actuating means being connected and arranged to rise and fall with the work support, substantially as described.

8. A channeling machine having, in combination, a work support, an edge gage provided with a toothed shank, a gear engaging the shank and connected with a lever, and means for moving the lever comprising a pin engaging the end of the lever and eccentrically fixed on a manually rotatable shaft, substantially as described.

9. A channeling machine having, in combination, a channeling knife, a work support, and a four-motion feed mechanism comprising a rod carrying a feeding device at one end, a sleeve embracing the rod, a drive shaft, crank connections between the shaft and the sleeve for reciprocating the latter, a cam carried by the shaft, and a cam lever actuated thereby and connected with the rod to impart longitudinal movements thereto, substantially as described.

10. A channeling machine, having, in combination, a rotatable work support for supporting a flat sole, a work feeding device above the work support, actuating means for said feeding device to cause it to engage and feed the sole, and means for rotating the work support intermittently in unison with the feeding movements of the work feeding device, substantially as described.

In testimony whereof I affix my signature, in presence of two witnesses.

WILLIAM C. MEYER.

Witnesses:
FRED O. FISH,
ALFRED H. HILDRETH.

Corrections in Letters Patent No. 984,773.

It is hereby certified that in Letters Patent No. 984,773, granted February 21, 1911, upon the application of William C. Meyer, of Boston, Massachusetts, for an improvement in "Channeling-Machines," errors appear in the printed specification requiring correction as follows: Page 4, line 89, the word "sole" should read *work*, and same page, line 90, first occurrence, the word "work" should read *sole;* and that the said Letters Patent should be read with these corrections therein that the same may conform to the record of the case in the Patent Office.

Signed and sealed this 21st day of March, A. D., 1911.

[SEAL.]

E. B. MOORE,
*Commissioner of Patents.*

Corrections in Letters Patent No. 984,773.

It is hereby certified that in Letters Patent No. 984,773, granted February 21, 1911, upon the application of William C. Meyer, of Boston, Massachusetts, for an improvement in "Channeling-Machines," errors appear in the printed specification requiring correction as follows: Page 4, line 89, the word "sole" should read *work*, and same page, line 90, first occurrence, the word "work" should read *sole;* and that the said Letters Patent should be read with these corrections therein that the same may conform to the record of the case in the Patent Office.

Signed and sealed this 21st day of March, A. D., 1911.

[SEAL.]

E. B. MOORE,
*Commissioner of Patents.*